June 6, 1967 — S. RENNERT — 3,323,186
STRAP FASTENER
Filed Dec. 1, 1965 — 2 Sheets-Sheet 1
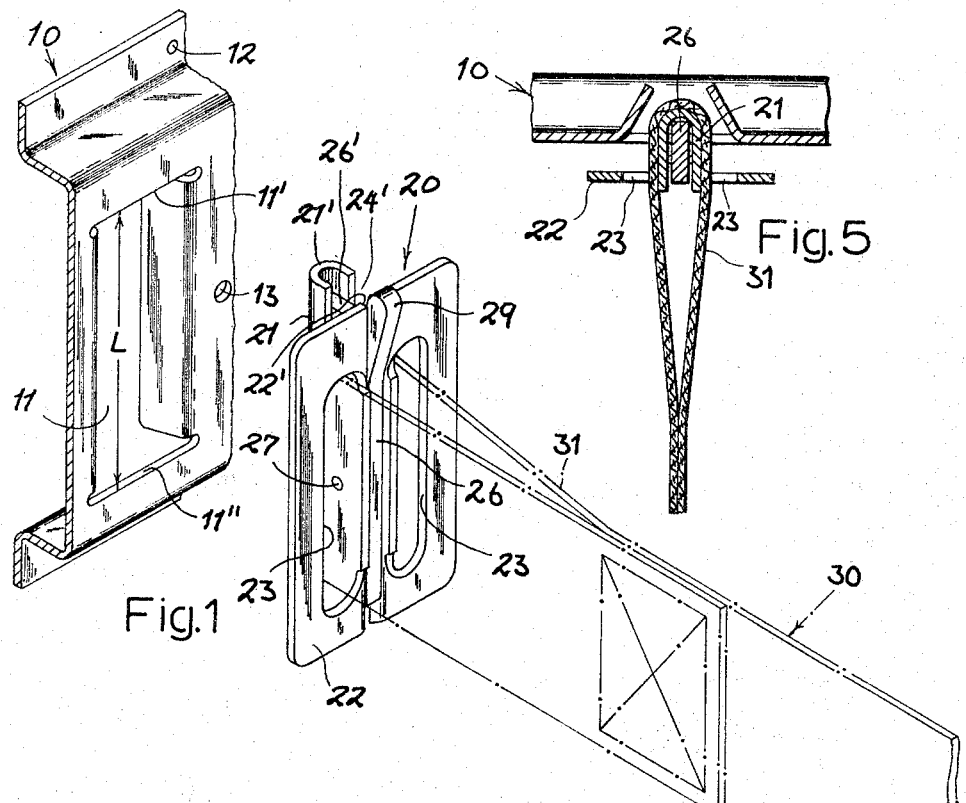
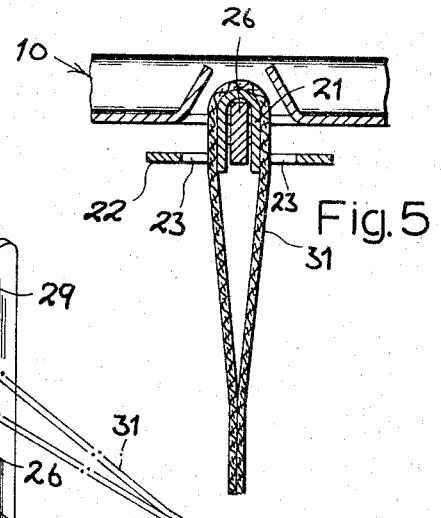
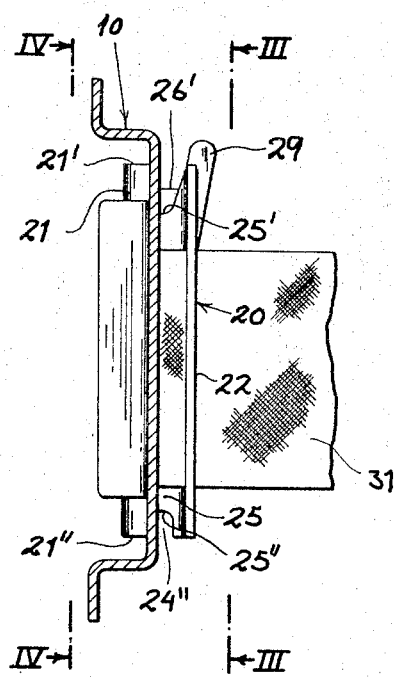
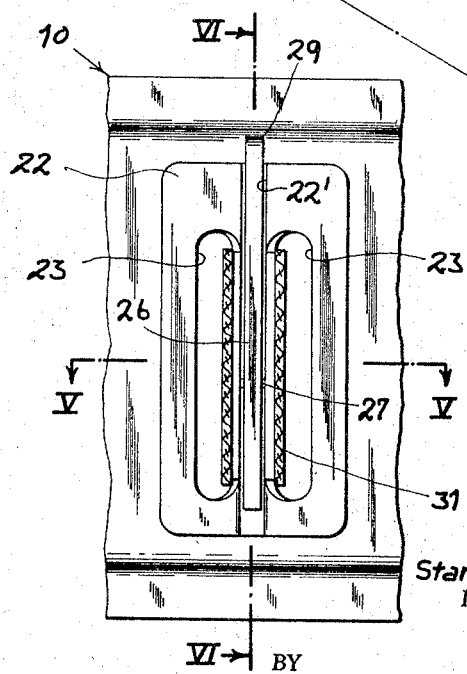
Stanley Rennert
INVENTOR.
BY Karl F. Ross
Attorney

United States Patent Office 3,323,186
Patented June 6, 1967

3,323,186
STRAP FASTENER
Stanley Rennert, 4 Washington Square Village,
New York, N.Y. 10012
Filed Dec. 1, 1965, Ser. No. 510,749
7 Claims. (Cl. 24—201)

This application is a continuation-in-part of my copending application Ser. No. 438,844, filed Mar. 11, 1965, now abandoned.

My present invention relates to a fastener of the type wherein a female member, sometimes referred to as a track, is removably connected with a complementary male member, or bolt, received in an opening of the former. Such fastener assemblies may be used in conjunction with, preferably, resilient elements including, for example, the ends of a strap designed to hold cargo in position on a truck or other vehicle for releasably joining these elements to each other.

The general object of my invention is to provide an improved fastener of the character set forth which is virtually foolproof and, once assembled, will not prematurely release the associated strap ends or other elements even in response to fortuitous stresses or impacts liable to occur especially in the transportation of goods by road or rail.

A related object is to provide a fastener whose members can be quickly coupled and decoupled by proper manipulation yet which is simple to manufacture and comprises only a minimum number of movable parts.

A more particular object of this invention is to provide a male fastener member which cannot be disengaged from its complementary female member by bending or shear forces or by the exertion of pressure upon any of its parts.

According to this invention, a male member designed to co-operate with a complementary female member, the latter having a frame with a generally rectangular opening, comprises a base which is larger than the opening of the female member and which is provided on its rear surface with a tongue having a length (as measured in a direction parallel to that surface) greater than the length of the opening, the width of the tongue being smaller than the width of the opening; this tongue is formed next to the adjoining base surfaces with opposite lengthwise incisions whose combined depth exceeds the difference in length between the opening and the tongue so that the connection between the tongue and the opening consists of a web which is shorter than the opening. In order to facilitate manipulation of the tongue so that it will clear the inner edges of the frame of the female member defining the minor sides of the opening, one of the incisions is deeper than the other to an extent sufficient to make the distance from a proximal edge of the web, i.e. the edge at the bottom of this deeper incision, to the distal end of the tongue shorter than the length of the opening. When one of the minor-side edges of the frame is introduced into the deeper incision, the opposite inner frame edge clears the aforementioned distal end of the tongue and is free to enter the shallow incision with partial retraction of the first-mentioned edge from the deeper incision.

The two members are now coupled to each other, withdrawal of the tongue from the opening being prevented by the length of that tongue which exceeds that of the opening. Such withdrawal, however would still be possible by a relative shift of the two members in longitudinal direction of the tongue, i.e. a motion opposite the one by which they were interengaged. To prevent such reversal of motion, my invention provides for the presence of a spring-loaded latch on the tongue which is biased into a position alongside the web partly obstructing the deeper incision; this latch must be withdrawn against its biasing spring force to allow for a sufficiently deep introduction of the first frame edge into the deeper incision so that the opposite edge can be lodged in the shallower incision, as described above. After the two members have been shifted into their engaged position, the latch snaps back into the deeper incision and now penetrates the frame opening at a location whose distance from the distal end of the tongue is greater than the length of the opening so that a relative shift of the members to facilitate their disengagement is no longer possible. To permit such disengagement, the latch must again be retracted; in accordance with an important feature of this invention, such retraction requires a force whose untimely occurrence in the case of strapped cargo and the like is extremely unlikely, i.e. the exertion of a forward pull (in a direction away from the tongue) upon an extension of the latch which is accessible from the front side of the base opposite the tongue.

The latch, advantageously, has the shape of a lever pivotally secured to the tongue, a tip of this lever traversing a slit in the base to consitute the accessible extension upon which the forward pull necessary for the decoupling of the assembly may be manually exerted. In a preferred embodiment, the tongue and its web are trough-shaped and partly embrace the lever.

The invention will be described in greater detail with reference to the accompanying drawing in which:

FIG. 1 is a perspective view of two disengaged fastener members forming part of an assembly according to the invention;

FIG. 2 is a side-elevational view of the two members of FIG. 1 in assembled condition;

FIG. 3 is a front view of the assembly taken on the line III—III of FIG. 2;

FIG. 5 is a cross-sectional view taken on the line V—V of FIG. 3;

Figure 4:
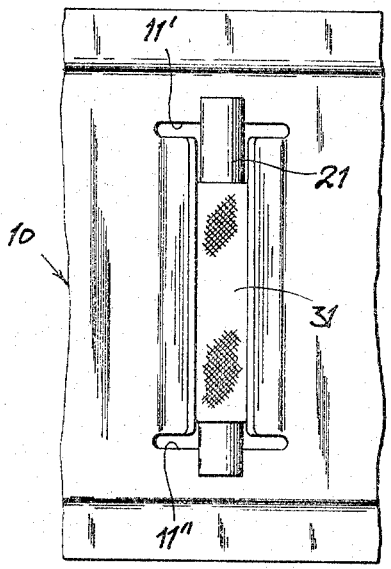
FIG. 4 is rear view of the assembly taken on the line IV—IV of FIG. 2.

The assembly shown in the drawing comprises a female member 10 and a male member 20, the latter being fastended to a strap 30 having an extremity 31 looped around the trough-shaped tongue 21 extending along the rear surface of a substantially rectangular base 22 of member 21. Base 22 is formed with two longitudinal slots 23, parallel to and on opposite sides of tongue 21, which are traversed by the loop 31. Female member 10 forms a frame around an opening 11 and is shown provided with mounting holes 12, 13 by which it may be secured to the body of a vehicle, such as a truck or a flat car, to which the other end (not shown) of strap 30 is also fixedly attached. Naturally, this lower end of strap 30 could also be directly secured, e.g. by rivets, to the track member 10 which has been shown only in part since its configuration beyond the opening 11 is immaterial purposes of this invention.

Figure 7:
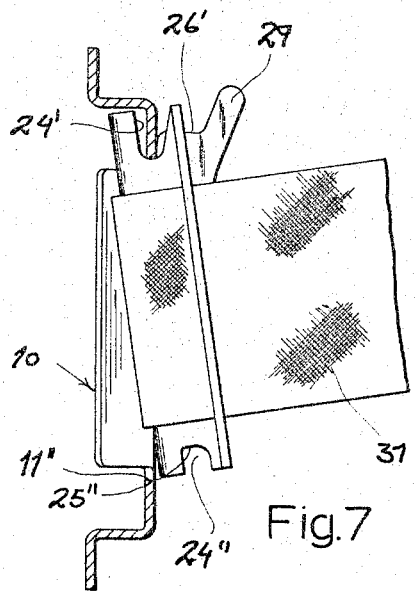
FIG. 7 is a view similar to FIG. 6 but showing the assembly in a position of partial disengagement of its members.

Male member or bolt 20 is formed with two longitudinal incisions 24' and 24", the upper incision 24' being substantially twice as deep as the lower incision 24". Tongue 21 is of greater length than the rectangular opening 11 of member 10. Incisions 24' and 24" define between them a web 25 whose upper edge 25', i.e. the proximal edge as seen from the deeper incision 24', is separated from the lower or distal end 21" of tongue 21 by a distance smaller than the length L of opening 11. Conversely, the distance between the lower edge 25" of web 25 (i.e. the distal edge as seen from incision 24') to the proximal or upper end 21' of tongue 21 is greater than the length L. An interfitting of members 10 and 20 thus becomes possible only if, as shown in FIG. 7, the upper inner edge 11' of opening 11 is first inserted into incision 24' whereupon the lower edge 11" of member 10 clears the end 21" so that the member 20 may be swung clockwise to enter the opening 11, with its rear surface of base 22 then resting against the front surface of the portion of member 10 framing the opening 11.

Figure 6:
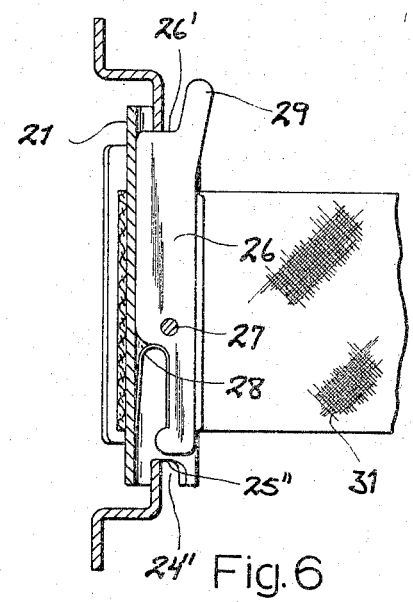
FIG. 6 is a sectional view of the assembly taken on the line VI—VI of FIG. 3.

In order to lock the members 10 and 20 in their engaged position illustrated in FIG. 6, a latch lever 26 is pivoted at 27 to the tongue 22 so as to be partly embraced by the flanks of its U-shaped cross-section. A leaf spring 28 bears upon the lever 26 and upon the inner surface of tongue 22 in such manner as to tend to swing the lever counterclockwise about its pivot 27, thereby introducing a shoulder 26' of the lever into the incision 24' (and therefore into the opening 11, upon interengagement of the two members) so as to block any upward sliding of member 20 with reference to member 10 to an extent sufficient to enable a disengaging movement of the type illustrated in FIG. 7. Shoulder 26', for this purpose, obstructs substantially half the depth of incision 24' and, as seen in FIG. 6, has a distance from the opposite end 21" of tongue 21 which is greater than the length L and substantially corresponding to the spacing between edge 25" and 21'.

Figure 8:
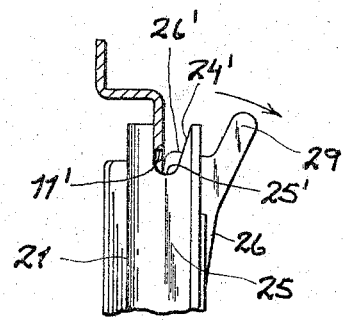
FIG. 8 is a fragmentary side-elevational view of the male member in a retracted position of its latch means.

A tip 29 of lever 26, passing through a slit 22' at the top of base 22, is accessible from the front and can be manually grasped for the purpose of being pulled forwardly, as indicated by the arrow in FIG. 8, to swing the lever 26 clockwise about its pivot 27 against the force of spring 28 whereby incision 24' is unblocked to the full extent of its depth. This temporary unblocking unlatches the bolt 20 and permits its removal from track 10, as illustrated in FIG. 7; it also enables a subsequent reassembly of the two members in the manner already described.

Modifications of the structural details described and illustrated, e.g. as regards the shape and location of biasing spring 28, are, of course, possible and will readily occur to persons skilled in the art without constituting a departure from the spirit and scope of my invention as defined in the appended claims.

I claim:

1. A fastener constituted by a female member and a male member removably connected with said female member; said female member comprising a frame with a generally rectangular opening; said male member comprising a base larger than said opening and a tongue on a surface of said base having a length parallel to said surface greater than the length of said opening and a width parallel to said surface smaller than the width of said opening, said tongue being formed next to said surface with opposite lengthwise incisions of a combined depth exceeding the difference in length between said opening and said tongue whereby the latter remains connected with said base by a web shorter than said opening, one of said incisions being deeper than the other to an extent sufficient to make the distance from a proximal edge of said web to the distal end of said tongue shorter than the length of said opening whereby an inner edge of said frame defining a minor side of its opening clears said distal end upon introduction of an opposite inner edge of said frame into said deeper incision, the distance from the distal end of said web to the opposite end of said tongue being greater than the length of said opening, said inner frame edges engaging in said incisions; and spring-loaded latch means on said tongue biased into a position alongside said web partly obstructing said deeper incision and penetrating said opening at a location whose distance from said distal end is greater than the length of said opening whereby said frame is prevented from disengaging said tongue, said latch means having an extension accessible from a side of said base opposite said tongue and manually movable away from said tongue against the biasing spring force for unblocking said deeper incision and facilitating removal of said tongue from said frame; said male and female members being connectable with respective elements to be releasably fastened to each other.

2. A fastener as defined in claim 1 wherein said deeper incision is substantially twice as deep as said other incision.

3. A fastener as defined in claim 1 wherein said latch means is a lever pivotally secured to said tongue.

4. A fastener as defined in claim 3 wherein said tongue and web are trough-shaped and partly embrace said lever.

5. A fastener as defined in claim 4 wherein said lever is provided with a biasing spring received in said trough-shaped tongue.

6. A fastener as defined in claim 3 wherein said base has a slit in line with said deeper incision, said extension being a tip of said lever traversing said slit.

7. A fastener as defined in claim 1 wherein said base is formed with parallel slots on opposite sides of said tongue, one of the elements to be fastened being a strap looped around said tongue and passing through said slots.

References Cited

UNITED STATES PATENTS 2,980,037    4/1961    Elsner.
2,984,855    5/1961    Elsner             24—265
3,178,790    4/1965    Cech.

BERNARD A. GELAK, *Primary Examiner.*